United States Patent [19]

Edwards

[11] Patent Number: 4,540,238
[45] Date of Patent: Sep. 10, 1985

[54] BILEVEL TELEMICROSCOPIC APPARATUS

[76] Inventor: D. Brandon Edwards, 2004 Centell Rd., Virginia Beach, Va. 23451

[21] Appl. No.: 348,823

[22] Filed: Feb. 16, 1982

[51] Int. Cl.³ .............................................. G02B 23/00
[52] U.S. Cl. .................................... 350/146; 350/547; 351/158
[58] Field of Search .............. 350/146, 145, 547, 548, 350/549, 515; 351/158, 41, 57, 58, 159, 165

[56] References Cited

U.S. PATENT DOCUMENTS

| | | | |
|---|---|---|---|
| 414,860 | 8/1946 | Borghese | 350/146 |
| 945,078 | 1/1910 | Beebe . | |
| 2,027,123 | 1/1936 | Searles . | |
| 2,217,475 | 10/1940 | Goehring, Sr. . | |
| 2,256,587 | 9/1941 | Ames, Jr. et al. . | |
| 2,280,354 | 4/1942 | Rezos . | |
| 2,389,428 | 11/1945 | Glasser | 350/547 |
| 2,422,661 | 6/1947 | Ellis . | |
| 2,545,673 | 3/1951 | Pozarik . | |
| 2,599,716 | 6/1952 | May . | |
| 2,675,740 | 4/1954 | Barkley | 351/165 |
| 2,759,395 | 8/1956 | Wofford . | |
| 2,978,955 | 4/1961 | Frommer . | |
| 3,273,456 | 9/1966 | Feinbloom | 350/146 |
| 3,456,327 | 7/1969 | Keeler | 350/146 |
| 3,522,983 | 8/1970 | Daniels | 350/146 |
| 3,592,525 | 1/1971 | Schultz | 350/146 |
| 3,741,634 | 6/1973 | Stoltze | 351/57 |
| 3,826,564 | 7/1974 | Werling | 351/165 |
| 4,074,368 | 2/1978 | Levy, Jr. et al. | 3/13 |
| 4,195,918 | 4/1980 | Freche et al. | 350/145 |

FOREIGN PATENT DOCUMENTS

| | | | |
|---|---|---|---|
| 701614 | 3/1931 | France | 350/146 |
| 484439 | 9/1953 | Italy | 351/158 |

OTHER PUBLICATIONS

Captioned photograph of Salvador Dali, Northern Virginia Sun Newspaper, Tuesday, Jul. 9, 1963.
"Honeybee Glasses", *Discover*, Dec. 1981, p. 72.

*Primary Examiner*—Jon W. Henry
*Attorney, Agent, or Firm*—Hamilton, Brook, Smith & Reynolds

[57] ABSTRACT

Telemicroscopes mounted to spectacle lenses extend rearwardly from the lenses toward a patient's eyes. The telemicroscopes are miniaturized and provide an extended depth of field and a field of view ranging from 8 degrees to 20 degrees. The spectacle lenses are shaded to increase the field of view, and the image viewed through the telemicroscopes matches the perceived outer diameter of the telemicroscopes. With the very small scopes positioned at about the center viewing axis of the eye, bilevel viewing in which a magnified image and a nonmagnified image are simultaneously viewed is possible. Several telemicroscopes may be mounted in a cluster for panoramic viewing.

33 Claims, 20 Drawing Figures

BILEVEL TELEMICROSCOPIC APPARATUS

DESCRIPTION

1. Technical Field

This invention relates to telemicroscopes and in particular to such scopes mounted to spectacle lenses.

2. Background

Small telemicroscopes mounted to the lenses of otherwise conventional spectacles have proven helpful to individuals who suffer low vision. The term telemicroscopes is intended to include both instruments used to make distant objects appear nearer, and thus larger (telescopes), and instruments used to make near objects appear larger (microscopes). A particular telemicroscopic arrangement which has been used by low vision individuals is an adaptation of that shown in U.S. Pat. No. 3,273,456 to Dr. William Feinbloom. Dr. Feinbloom's spectacles incorporate a telemicroscope which extends through and is supported by conventional spectacle lenses. That apparatus provides high quality magnified images to the low vision individual over a fairly short depth of field. It is helpful to the individual who wishes to supplement his regular vision by magnifying objects within some specific range of distances. With such an apparatus, the patient might ordinarily view through the conventional spectacle lenses and then focus on distant objects for magnification as required. There are two primary disadvantages of the Feinbloom apparatus. His telemicroscopes are readily apparent and thus cosmetically displeasing to the wearer, and they are also heavy and thus uncomfortable to the wearer over an extended period of use. Further, the scopes are limited in their depth of field.

A primary object of this invention is to provide lightweight telemicroscopic spectacles which, to the casual observer, appear to be completely conventional. Further objects of this invention are to provide such spectacles which have a significant depth of view. The telemicroscopic apparatus described herein meets those objects and further offers an advantageous bilevel vision which has heretofore not been possible.

DISCLOSURE OF THE INVENTION

In accordance with this invention, telemicroscopes mounted to spectacle lenses extend rearwardly from those lenses toward a patient's eyes. The telemicroscopes do not protrude beyond the carrier lenses. The telemicroscopes are miniaturized such that they have an overall length of less than 16 millimeters and an outer diameter of less than 10 millimeters. An internal diaphragm, preferably less than 4 millimeters, offers an extended depth of field. The short length of the telemicroscope lends to the significant field of view of the scope.

The field of view of the scope is increased further by proper tinting of the carrier lens to limit the amount of diffused light which reaches the eye. Such tinting of the lens can result in an enlarged magnified image which can match the viewed outer periphery of the telemicroscope. In that way, the magnified image and the regular, non-magnified image meet at a clean boundary with no overlap and with no dead zone between the two.

Because the size of the magnified image is dependent on the environmental light conditions, an external diaphragm on the scope can be used to increase the perceived outer periphery of the scope to match an increased size magnified image and thus avoid overlap of magnified and regular images.

The very small telemicroscope can be positioned with one edge at about the eye's central viewing axis. Thus, with a scope having an outer diameter of less than 10 mm as described above, the optic axis of the scope is within 5 mm of the eye's central viewing axis. Bilevel vision is thereby made possible. In bilevel vision, the patient observes the regular field of view and the smaller magnified field of view simultaneously with no confusion. With the bilevel effect, the patient need not focus first on the regular view and then the magnified view; both views are continuously apparent to him.

Preferably, the telemicroscopes are adjustable by a screw connection of positive and negative lenses so that special prescriptions are not required. However, depending on patient needs, a small prescription lens may be placed in line with the telemicroscope.

Several telemicroscopes may be mounted on each spectacle lens in a cluster to allow panaromic viewing.

A preferred telemicroscope embodying this invention is a miniature optical system, approximately 6.35 millimeters in outer diameter, based in principle on the Galileon telemicroscope. It is designed primarily for, but not limited to, low vision patients. This device aids in seeing fine detail from great distances (telescopic viewing) to very near (microscopic viewing). Hence, it may be used by almost anyone with a visual impairment for which magnification of some degree at any distance minimizes or corrects the malady. This system is made of plastic, nylon (or other such light weight materials), and flint glass; and is mounted either on or within a framed spectacle carrier lens having a uniquely designed tint or shading pattern. This scope would normally be positioned on or in the carrier lens in front of the pupil, slightly above (or below) the viewer's normal line of sight along the horizontal plane. The positive plastic and negative flint glass elements (lenses) are mechanically spaced apart through interconnected threaded tubes used for focal adjustment purposes. When the scope is mounted in the carrier lens the front surface of the positive element rests flush with the front surface of the carrier. The negative element in turn is positioned eyelash length from the eye cornea. Even if the scope is attached to the rear surface of the carrier lens, the negative element is no closer than eyelash length from the eyeball. The dioptric powers (and/or focal lengths) of both positive and negative lenses may vary widely depending on the scope magnification power and overall length desired. However, it is preferable that the positive element range between 62.5 and 110 diopters while the negative element range spans minus 250 to minus 330 diopters. These ranges afford scopes from three to five power at the telescopic setting (slightly higher for the microscopic setting) while maintaining an overall length of eight to fifteen millimeters.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the corresponding parts throughout the different views. The drawings are not necessarily to scale, emphasis instead being placed upon illustrating the principles of the invention.

DESCRIPTION OF PREFERRED EMBODIMENTS OF THE INVENTION

General Description

Figure 4:
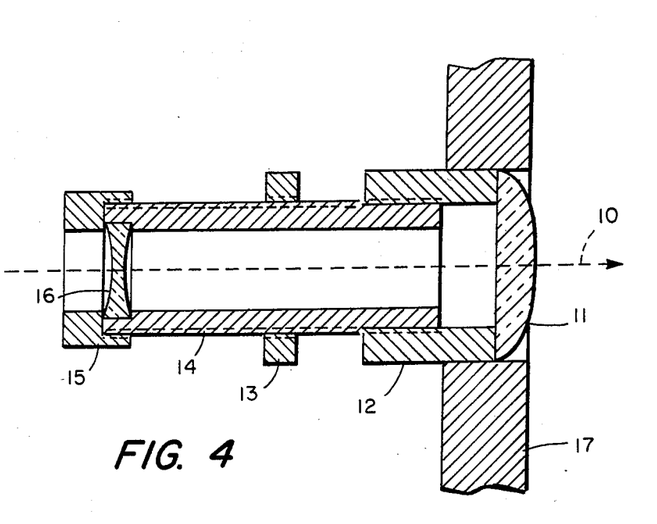
FIG. 4 is an enlarged elevational sectional view of a telemicroscope of any of FIGS. 1–3.

This invention relates to improvements realized when a Galileon telemicroscope (hereafer also referred to as scope, instrument or optical system) is miniaturized in a unique fashion. The present invention was initially developed to aid low vision patients who require magnification to increase or otherwise improve their visual capabilities. The characteristics, both basic and general, desired of an aid of this nature by low vision patients are numerous. Several of these characteristics, some of which are particularly unique and advantageous, are embodied in the present invention and are as following:

The telemicroscope design as shown, for example, in FIG. 4 is of an overall tubular structure. A positive plastic lens or element 11 is centered over one end of a larger plastic internally threaded tube 12. This tube is tinted to an almost opaque shade, thereby controlling external light diffusion within the scope. The negative flint glass lens 16 of the system is mounted in one end of a smaller diameter, externally threaded, nylon tube 14. Likewise, this tube is dyed black both internally and externally to eliminate annoying glare within the optical system. A smaller dyed nylon cap-tube 15 screws over the negative element end of the longer nylon tube thereby securing the negative lens. The positive element plastic tube 12 is joined to the negative element nylon tube 14 by screwing the nylon tube into the larger plastic tube such that the lenses are at opposite ends of the now adjustable scope. A thin, fitting or internally threaded, external diaphragm disk 13 (black nylon) is located on the nylon negative element tube between the positive and negative lens elements. This disk may be screwed along the nylon tube toward the positive element during high luminosity lighting conditions or toward the negative element during low environmental lighting conditions. As discussed below, this disk aids in preventing regular and magnified field overlapping, a distraction to the viewer. The scope may now be mounted on the front, on the rear, or within a glass or plastic carrier lens 17. Any composition or style of frame may be used for mounting the carrier lens; however, a metal or wire type frame is preferable both for weight and adjustment purposes. Depending on the user's needs or preference, one scope may be employed for monocular use or two scopes may be custom aligned producing a binocular effect.

This optical system is small and hence unobtrusive to the extent of being almost unnoticeable to all but the user. In this manner cosmetic appearance is enhanced. Being light weight, approximately 0.3 grams, the scope affords ease of use for extended periods of time without discomfort. The small interior diaphragm diameter of less than about 4 mm, the small overall exterior diameter of the scope, 4.75 to 10 millimeters, the short length of the scope and its positioning relative to the eye pupil allows for a one-time telescopic focal adjustment for clear viewing for distances beyond one meter. This characteristic enables the viewer focusing capability over a great depth of field without having to again adjust the scope for focus at a different distance beyond one meter.

Figure 6:
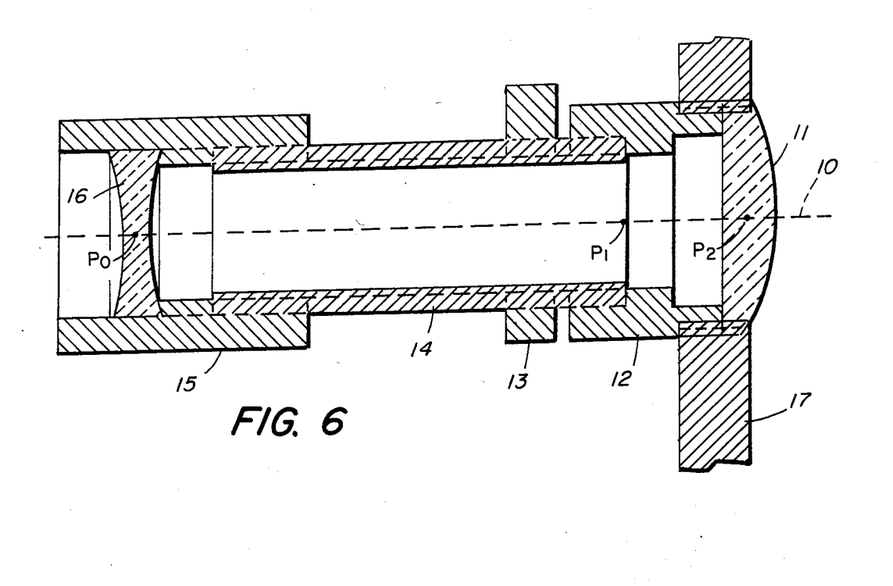
FIG. 6 is an enlarged elevational section of yet another form of telemicroscope suitable for use in the spectacles of FIGS. 1–3.

In order to insure the proper depth of field ( no less than 500 ft.) while maintaining the largest possible angular magnified field of view in the present telescopic system, it has been determined that a particular ratio relationship should be established. With reference to FIG. 6, that ratio is between, one, the distance $L_N$ from the center, $P_O$, of negative lens element 16 to the effective diaphragm of the scope at point $P_1$ and, two, the internal diameter of the scope, $ID_N$ (usually the I.D. of the smaller nylon negative element tube). The effective diaphragm of the scope is, in this case, the point at which the smallest inner diameter of the scope is displaced furthest from the negative lens 16. It should be no more than 2 mm behind the center point $P_2$ of the positive lens 11. This ratio should be within the range of 10/2.7 to 10/3.3 and preferably is about 10 mm/3.0 mm. Because miniaturization is greatly desired in this instrument, it is preferred that the distance between positive and negative lens elements be no more than sixteen millimeters apart. This maximum length should easily accomodate a patient with deeply set eye sockets. For this maximum sixteen millimeter distance the overall diameter of the telescope can be kept at a minimum.

The 10/3.0 ratio is used to set a proportion for determining the I.D. of the smaller nylon negative element tube once the desired scope power and overall length has been chosen. Thus the proportion should read:

$$\frac{L_N}{ID_N} = \frac{10}{3.0}$$

where $L_N$ is chosen according to patient need and preference. $ID_N$ is then found by solving the proportion.

When this scope is being employed as a microscopic unit, the great depth of field is no longer present nor is it necessary. Here the shorter microscopic settings are for specific normal close reading distances from sixteen inches and closer to the eye. Hence emphasis may now be placed on expanding the angular magnified field of view which enhances reading capabilities. Through the changing of five basic scope parameters either independently or in varying combinations with each other, the magnified field of view may be widened. This may be achieved by 1. shortening $L_N$, 2. increasing $ID_N$ and if necessary the internal and external diameters of the positive element plastic tube, 3. darkening the tint on the carrier, 4. decreasing the overall power of the scope unit and 5. decreasing the distances between the negative and positive lens elements. The parameters manipulated will again depend on the patient. In order to avoid optical distortion around the periphery of the magnified field it is recommended that the internal diameter of this microscopic system not exceed four millimeters nor its overall length exceed 16 millimeters.

The fact that this scope is manually adjustable for the individual's personal acuity capabilities precludes the need for an inline spectacle prescription correction if the patient normally wears such a prescription. And if, in the case of a few patients, an in-line prescription lens is necessary; it may be placed next to and behind the negative lens element in the nylon barrel 14 or cap-tube 15. Of course, if in fact the patient uses a spectacle correction, such a prescription could be ground into the scope carrier lens.

Figures 2, 3A, 3B, 3C:
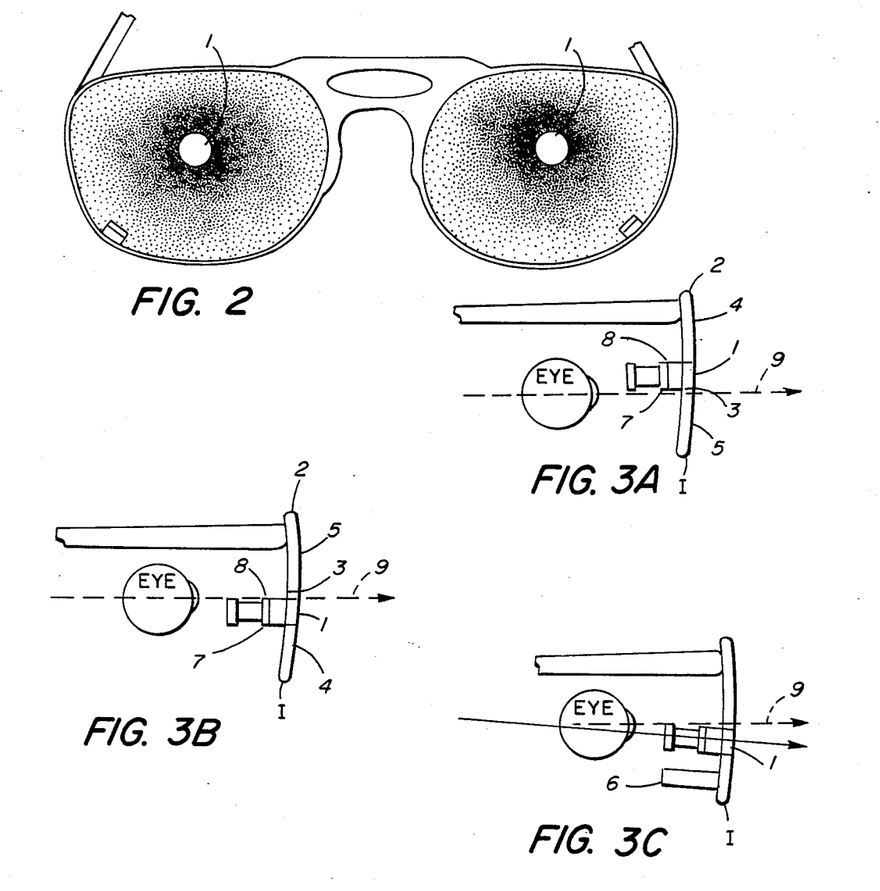
FIG. 2 is a perspective view of an alternative embodiment of this invention designed primarily for assisting patients suffering macula degeneration.
FIGS. 3A–3C are side views illustrating three possible positions of a telemicroscope in a spectacle lens carrier.

In addition to the telescopic capabilities of this optical system, this scope may easily be converted to a microscopic system for reading from forty-five centimeters and closer. By unscrewing the negative and positive elements one or more revolutions, thus increasing the distance between the lens elements one or more millimeters, the telescope becomes a microscope. This property is of particular convenience for monocular vision users. However, if close reading is to be done on a consistent basis it is more advantageous both for monocular and binocular viewing that the telescopic and microscopic observations be made using separate instruments or systems. The microscope can then be made larger in diameter, 10 millimeters, for a wider field of view. The microscope could then be adjusted for near viewing and mounted toward the bottom of the carrier lens for convenience of use (FIG. 3C). The overall length of the scope would remain basically the same as previously described.

When the scope is being used in conditions of high heat absorption, distortions in the magnified view may be rectified by slight focal adjustments in the distance between positive and negative elements. As has been previously mentioned, glare and haze normally internal to a system of this construction have been eliminated through dying of all plastic parts. Without the internal nonreflective tube surfaces, visual acuity through the scope would be diminished considerably.

Figure 5:
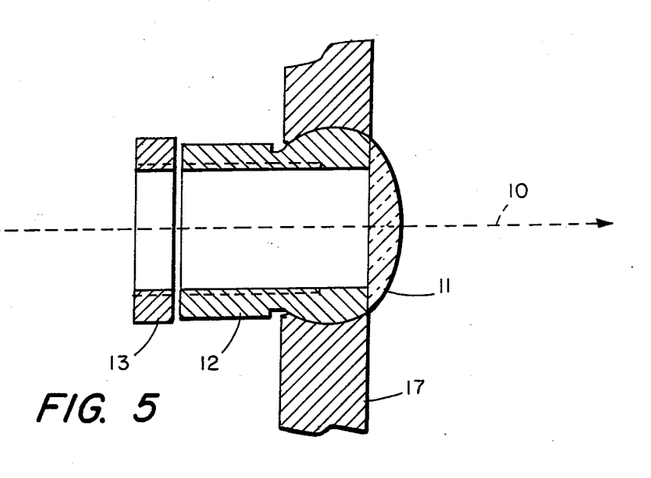
FIG. 5 is an enlarged elevational sectional view of an alternative mounting of the telemicroscope by means of a ball and socket connection.

A modification of the plastic element tube, shaping it spherically around its external diameter as shown in FIG. 5, affords this system the capability of being mounted in a socketed hole in a plastic spectacle carrier lens. This socketing aspect now allows for swivelling the scope for redirection in front of the pupil; a characteristic particularly useful to monocular vision users. Achievement of binocular vision for some exotropic patients using one standard fixed tube scope and one swivel scope is now conceivable.

When a scope of this nature is used in a reverse manner, that is, viewing through the scope with the positive element (rather than the negative element) closest to the pupil, a very wide view with low magnification is observed. Mounting the scope in this manner could afford a retinal degeneration or retinitis pigmentosa patient a convenient means of restoring some degree of peripheral vision.

In the cases of some macula degeneration patients, the telescope as previously described, when positioned with its center viewing axis coinsiding with the central line of sight (center of the patient's pupil) produces a visual picture perceived by the brain in what heretofore has been described as a void area or major blind spot in the patient's central field of view. The present invention in this manner appears to furnish viewing conditions suitable for brain recognition of light activated energy impulses from the retina which the the brain had ceased to acknowledge. Here the picture as seen through the scope appears in the area of the macula blind spot. And with proper carrier shading along with the appropriate scope magnification as dictated by the patient's needs this picture can be maximized to cover a relative large area of the blind spot in the patient's field of view. The carrier shading pattern is one which involves a graded darker to lighter tint progressing from the hole in which the scope is mounted (approximately at the carrier lens center directly forward of the patient's pupil) outward to the edge of the carrier lens. Some macula degeneration patients may have most if not all of the void or blind area in their field of view filled or covered with the image as projected by the scope.

Beyond the advantages of miniaturization of a scope of this nature such as those previously discribed, a particularly unique visual effect can be obtained with proper modification of this optical system. When the perceived external diameter of the scope (with the aid of the external diaphragm disk 13) and the internal diameter, or diaphragm, of the negative element cap-tube 15, 14 are properly limited in size and proper tint patterns for shading purposes are employed on the spectacle carrier lens, this special effect becomes readily apparent. Without that effect in viewing through a small telescope or field glasses, a tubular rim or barrel-like ring surrounding the magnified picture becomes immediately noticeable. This rim is viewed as a region with no image between the magnified and nonmagnified regions and can be an annoyance. And, as the luminosity in the environment increases, the tubular rim grows thicker, thereby decreasing the field of view of the magnified picture inside.

This thickening of the rim results from the closing of the pupil and desensitizing of rods on the retina with increased light. By coordinating the degree of tint and the pattern of tinted area on the carrier (and, if necessary, employing a standard clip-on spectacle sun shade) with the diameter of the diaphragm 13 surrounding the negative lens, this rim can be decreased in thickness from within the optical system. That is, light to the eye other than through the scope is limited to increase the perceived magnified image to a size which matches the perceived outer periphery of the scope. The magnified field of view as seen through the scope is increased. In fact, with careful coordination, the magnified picture can be made to closely match the perceived physical external diameter of the scope.

It is desirable to obtain the greatest magnified field of view possible and, under low light conditions, that field may expand beyond the perceived outer diameter of the scope and cause an annoying and distracting overlap of the magnified field on the regular field of view. The controlled shading governs the expansion and contraction of the iris and saline lens of the eye and the adjustable outer diaphragm adjusts the perceived outer diameter of the scope to eliminate that overlap and at the same instant allow for the greatest field of view through the scope.

More specifically, during low luminosity conditions such as indoors or at night, the natural environmental shading produces a picture on the retina (as seen through the scope) which appears larger in diameter than the physical outer diameter of the scope in the regular field of view. This appears as an overlap of the magnified and nonmagnified fields of view. That overlap is controlled by screwing the external diaphragm disk toward the eye pupil along the negative element nylon tube. This procedure has the effect of increasing the perceived external diameter of the scope as seen by the user. In this manner the two diameters are again rendered approximately the same size thus eliminating overlap of fields.

By maximizing the magnified field of view by means of a small diaphragm, short scope close to the eye and proper carrier lens tinting the miniaturized scope yields a viewing field equivalent in size to that of a comparably powered scope of much larger external diameter. The advantage to the low vision patient in particular is that of scope miniaturization with a much greater field of view than would normally be expected of a scope of this size.

The small diaphragm is also important in that higher power scopes in high luminosity conditions might otherwise damage the eye. On one hand, the dimming of light provided by the small diaphragm protects the eye from damage due to the high power scope. On the other hand, the high power scope allows for clear viewing even with dim light. If the scope disclosed dims the light too much for a given individual, nonreflective lenses can be used in the scope to allow more light to pass.

Figure 16:
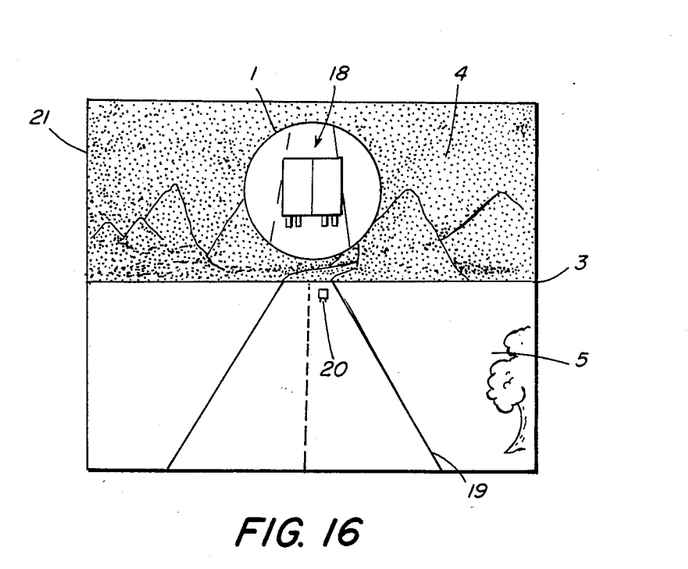
FIG. 16 is an illustration of bilevel vision.

A second unique visual effect is now possible as a result of the miniaturization, along with tint control of the magnified field just described. Employing a critical alignment procedure whereby the bottom or top of the scope as mounted in the carrier is brought to coincide with the central viewing axis of the eyeball through the center of the pupil (FIGS. 3A and 3B), a vertically bilevel, magnified/regular field of view combination can be attained as illustrated in FIG. 16. In this instance the viewer is able to observe two fields of view at once. The observer is able to see, simultaneously, his own (regular) visual parameters, however limited they may be; and, immediately adjacent to the center and within his regular visual field just above or below the horizon line, he also sees a magnified view of the central portion of the regular field of view. The adjacent magnified view appears above or below the horizon line depending on the positioning of the scope in the carrier as previously described. For monocular viewing in particular, a below the horizon line mounting of the scope affords a more accommodating conversion from telescopic to microscopic use when a single scope is being used for both functions.

In this manner, the present invention mechanically injects into the visual system of the patient the instantaneous capability of gathering here-to-fore unattainable detail over a great depth of field. And, because the two views are not overlapping (with aperture control), but are separate and distinct, there is no confusion on the part of the brain while integrating the two sources of information. For many low vision patients this will afford in a more normal and natural way more of what a normally sighted individual's unimpaired cornea, eye lens, retina, etc. afford in visual perception.

Bringing the low vision patient's visual and consequent overall physical capabilities more in line with the normally sighted has been the principle aim in the research and development of this invention. However, this instrument when custom fitted, as with low vision patients, will enhance the visual capacity of the normally sighted individual as well. Sportsmen, for example, of all types could find a scope(s) mounted in a flip-up, clip-on standard type sun shade used either with or without a prescription lens quite advantageous for such activities ranging from hunting to being a spectator.

Detailed Technical Description

Figure 1:
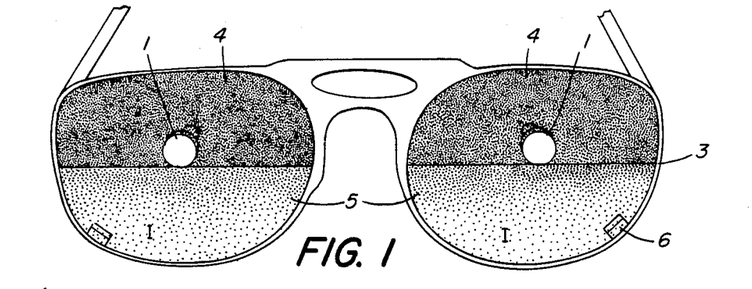
FIG. 1 is a perspective view of telemicroscopic spectacles embodying this invention and designed primarily for bilevel viewing.

FIG. 1 is a perspective view of a binocular version of optical systems 1 mounted (swivel socketed or cemented) in or on spectacle lens I in a sample metal frame 2. The tinting pattern is principally bisectioned on the spectacle carrier lens with the darker monoshaded area 4 from a horizontal line just below the scope over the upper portion of the carrier lens. The lower portion of the carrier area 5, is graded in tint darker to lighter from division line 3 downward to the carrier bottom. An optical system of this nature which is to be used over a wide range of lighting conditions can be fitted with a standard clip-on sun shade during bright environmental lighting use. The clip-on shade may have a tinted pattern similar to that of the carrier lens.

The shading cuts down on the amount of light to the pupil other than through the telemicroscope. The reduced light causes the pupil to dilate and causes the rods on the retina to become more active. That, in turn, results in an increase in the size of the magnified image perceived by the individual, that is an increased field of view. As noted above, that perceived image can be made to match the perceived outer diameter of the scope; but with high light conditions that perceived magnified image may shrink. Thus by means of a clip-on shade, the diameters of the scope and the magnified field seen through it can be kept approximately the same. Likewise, the simultaneous viewing of the bilevel magnified regular visual fields is maintained.

If the patient, in fact, needs or desires the clip-on shade, the circular area immediately in front of the scope 1 of the clip-on shade may have to be physically removed, again depending on patient need. The diameter of this hole in the clip-on shade should be slightly less than the external diameter of the scope and the hole should be centered with the central viewing axis 10 of the scope (FIG. 4).

With proper tint shading and careful coordination of the different diameters of the different elements of this system, the viewing angle through the scope ranges from approximately 8° in relatively bright (daylight) lighting conditions to approximately 20° for a relatively dimly lit (indoor) environment. These ranges will vary to some degree with individual patient capability.

FIG. 2 depicts a binocular carrier shade pattern previously described for macula degeneration patients. As can be seen the pattern grades from darker to lighter on the carrier in the immediate vicinity of the scope to the extremities of the carrier lenses. The basic configuration of the instrumentation is the same as FIG. 1 with the exception of the carrier tint pattern.

FIG. 3 is a series of side views of the scope as mounted to the carrier lens before the eyeball and entrance pupil. FIGS. 3A and 3B depict the scope mounted within the carrier I for bilevel viewing. It can be seen that the central viewing axis 9 of the eyeball coincides with the bottom edge 7 of the scope 1. Areas 4 and 5 of FIG. 3A are the same tint pattern as illustrated in FIG. 1. However, this tint pattern is reversed for a below-the-line-of-sight mounting as shown in FIG. 3B. Here, the top edge 8 of the scope is brought to coincide with the central viewing axis 9 of the entrance pupil of the eye. In FIG. 3B the darker tinted or shaded area 4 extends downward from division line 3, approximately two millimeters above the scope, to the bottom of the carrier, while the graded area 5 extends from darker to lighter tint over the upper portion of the carrier lens.

FIG. 3C displays a mounting position appropriate for bifocal close reading and other close observation. The angle θ may vary widely, 0° to 15°, depending on patient needs and preferences.

It should be noted at this point that the eyelash length of the scope from the cornea—even though the length of the scope required by the patients may vary—is maintained through the use and adjustment of different lengths and types of nose pads on the frame.

As an added safety feature, if desired by patient or doctor, a small plastic stop-block 6 may be anchored to the lower rear surface of each carrier lens as in FIG. 3C and FIG. 1. This block would be positioned just ahead of the cheek bone below the eye socket. In the event of an abnormally forceful blow to the spectacle lens or frame from the front or a side angle, this stop-block in conjunction with the molded nose bridge would prevent the projection of the negative element end of the scope into the cornea area of the eye. In this instance the impact would be absorbed by the cheek bone through the stop-block.

In addition at the final fitting of this instrument on the patient, the doctor or optician may have to retro-pivot the spectacle frame to slightly lift or tilt the rear or negative lens end of the scope approximately 1° maximum to insure consistency of the bilevel visual effect. If this adjustment is necessary it, again, will depend on individual patient visual needs.

Some individuals using this scope may require or desire more peripheral shading temporally during extreme bright lighting conditions. A frame and carrier lens with a more wrap-around style might be necessary to maintain consistency for the bilevel visual effect previously described under these conditions.

FIG. 4 is a sectional view of the telemicroscope mounted within a plastic spectacle carrier lens 17. FIG. 4A is the standard tubular design with line 10 representing the central optical viewing axis of the instrument. Moving from right to left in FIG. 4A the positive plastic lens 11 is optically centered over the ends of an internally threaded, opaquely tinted plastic tube 12. Mechanically connected by external threading to tube 12 is the negative element nylon tube 14. In the opposite end of the nylon tube 14 there is mounted—in a countersunken fashion—a negative lens element 16. An internally threaded nylon cap-tube 15 screws over the negative lens end of tube 14. Positioned on tube 14 is a loosely threaded nylon disk 13 (external diaphragm disk). As previously discussed this disk aids in controlling overlap of the magnified and regular fields of view under low lighting conditions through repositioning along tube 14. Under low lighting conditions the perceived magnified image would tend to increase in size and thus overlap the nonmagnified image. By moving the diaphragm toward the eye the perceived outer diameter of the scope is increased to continue to match the magnified image. All of the nylon parts described are treated with dye internally and externally to eliminate reflective glare in and about the scope surfaces.

A socketed model of this invention is denoted in FIG. 5. Here a socketed hole is fashioned in the carrier lens 17 with the center of the socket shifted toward the front surface of lens 17. Here the plastic tube 12 is machine shaped externally on one end in a spherical manner. Positive lens 11 is centered over this spherical end of tube 12 as was done on the standard tube FIG. 4. This particular socket configuration not only allows for swivelling before the pupil but also aids in safe use and maintenance of the scope. Through socketing in this way, the scope will snap in and out of the carrier 17 from the front surface of the carrier only, an important eye safety feature. The remaining parts of this scope are the same as those described in FIG. 4.

It is forseeable that some patients under extreme or constant bright lighting conditions may require a scope of outer dimensions smaller than previously described in order to comfortably maintain the bilevel effect. The smaller outer dimensions bring the center of the magnified field of view closer to the center of the regular field of view. FIG. 6 is a cross section of a scope specifically designed for these circumstances. The numbered parts are basically the same as those described in FIG. 4. However in this instance the smaller nylon externally threaded tube 14, is screwed in and tightly affixed to the positive element plastic tube such that it will not rotate for adjustment purposes. Immediately behind the positive element tube and screwed onto nylon tube 14 is the external diaphragm disk 13 functioning basically as described previously. Here the negative lens element is not positioned at the rear end of the nylon tube 14. Instead the negative element is now located within a modified nylon or plastic end-cap 15. As illustrated this modified end-cap has been internally threaded so as to allow for the initial scope focal adjustment. A sample scope of this type may have a base outer diameter of 4.75 mm; again varying in diameter with patient need or preference.

As an added convenience for both special adjustment purposes and ease of maintenance the positive element plastic tube may be externally threaded so as to screw the mount to the internally threaded hole within the carrier lens. This is illustrated in FIG. 6 along the front extremity of barrel 12. The external diaphragm disk as previously described is essential to the proper functioning of this particularly small diameter unit. Here again overlap control and the subsequent satisfactory bilevel effect can be maintained.

Figure 7A:
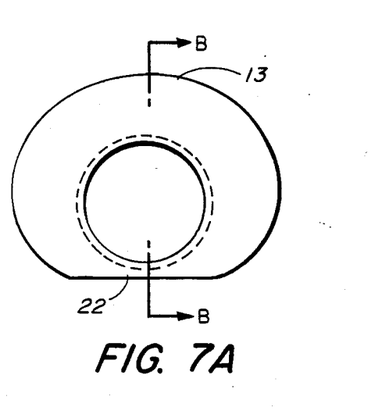
FIGS. 7A and 7B are front and sections views of an external diaphragm used in the telemicroscope of FIG. 6.
Figure 7B:
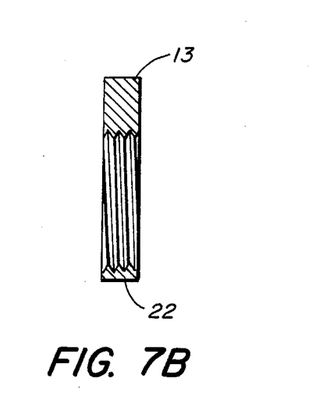

FIG. 7 is an illustration of the front and side views of a sample external diaphragm disk 13 to be used with the unit of FIG. 6. Here the disk has a larger diameter than the positive element tube 12. However flat edge 22 of disk 13 makes the disk asymmetric and is designed to coincide with the bottom extremity of the scope of FIG. 6 during periods of high environmental luminosity conditions when the scope is in a carrier mount position (FIG. 3A). In this instance the disk rests close to the positive element tube 12. During periods of low luminosity use, disk 13 rests close to the negative element tube 15 with the flat edge 22 at the top extremity of tube 12. The disk then is perceived as a larger outer periphery of the scope along the lower edge. The upper edge is less critical because of the dark tint of the carrier lens. The reversing of the flat edge 22 setting would be necessary for a scope carrier mounting as in FIG. 3B in order to maintain the bilevel effect without overlap of magnified and regular fields. Once more, the external diameter of the diaphragm disk 13 will vary with individual patient need.

When the diameter of disk 13 is larger than that of any of the positive element tubes previously described, the disk not only serves to control field overlay but also aids in further shading the eye in the immediate vicinity of the pupil, an important factor in instances of high luminosity conditions.

Figure 8:
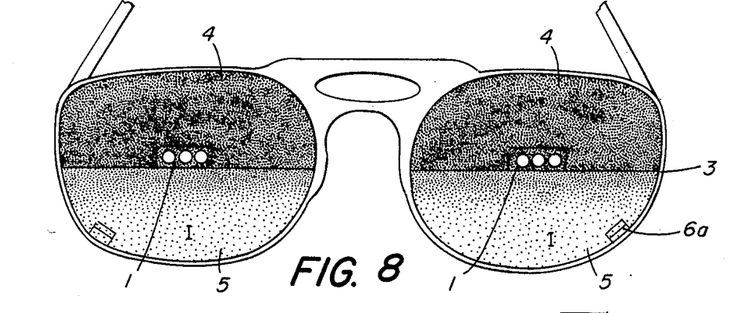
FIG. 8 is a perspective view of yet another embodiment of the invention in which three telemicroscopes are mounted in each spectacle lens in a linear cluster for panaromic viewing.
Figure 9:
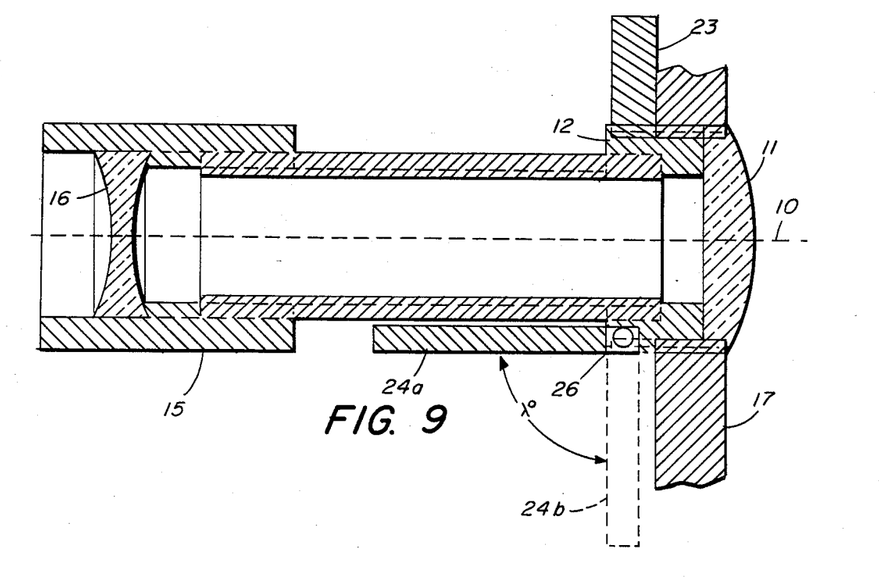
FIG. 9 is an enlarged elevational section of a telemicroscope used in the spectacles of FIG. 8 and showing a hinged visor.
Figure 10A:
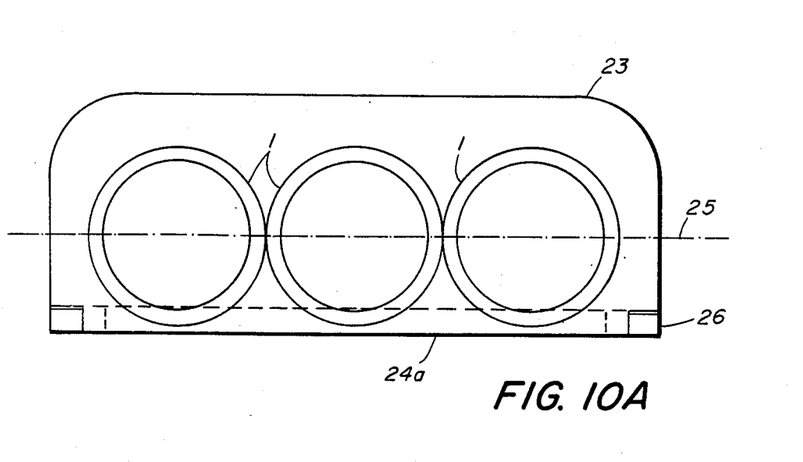
FIGS. 10A and 10B are enlarged front views of a cluster of telemicroscopes as in FIG. 8 with the visor in its respective raised and lowered positions.
Figure 10B:
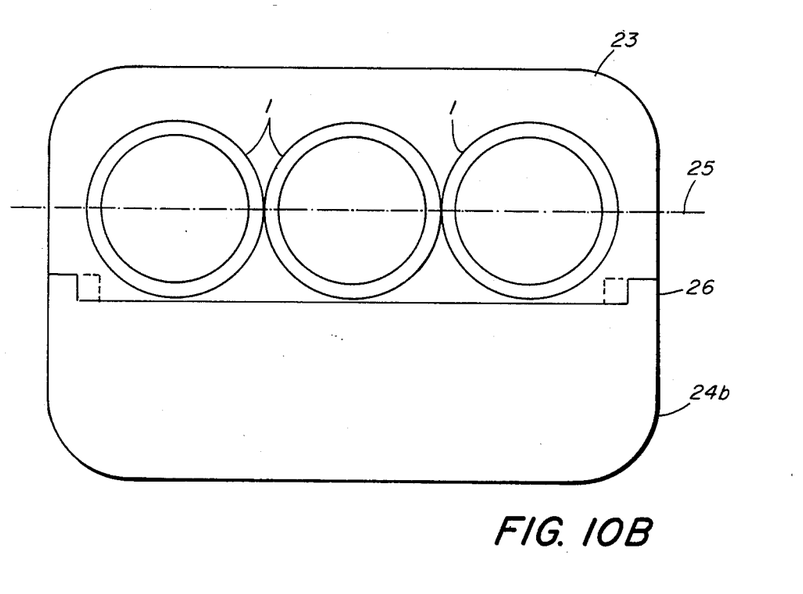

As a direct result of the carrier lens tinting techniques, miniaturization of scopes, and bilevel visual attainment, it is now possible to use a combination of these smaller scopes as in FIGS. 8-10 in a side by side parallel alignment to produce a panorama visual effect. Through careful alignment procedures with at least two and preferably three or more scopes in close proximity of each other on a straight line 25, the angular view through the scopes is increased considerably. Here, carrier lens shading is crucial for blending the views through the individual scopes into a uniformly consistent lateral span just above (or below) the normal line of sight through the center of the pupil with the bilevel viewing effect. All scopes in this configuration may remain adjustable; however, simple and consistent focal uniformity might be best maintained by predetermining for that particular patient the proper initial telescope and microscope adjustment settings and permanently fixing each unit in the configuration to this setting. The great depth of field as previously described will remain as such. The use of these miniature scopes properly aligned with each other and proper carrier tinting precludes the need for weighty and cosmetically unattractive prismatic picture-blending elements to produce a panoramic viewing effect.

When the tri-scope panorama bilevel configuration of FIGS. 8-10 is being employed, prevention of regular and magnified field overlay is accomplished through the use of a thin nylon plate and visor structure. This structure designated the external diaphragm plate and hinge suspended visor is depicted in FIGS. 9 and 10. Its purpose is essentially the same as that of the external diaphragm disk of FIG. 7. As can be seen in FIG. 9 the external diaphragm plate 23 is affixed to the scope barrel 12 through internal plate and external barrel threading. This plate rests immediately behind the carrier 17. Suspended from the bottom of the diaphragm plate 25 on hinge 26 is the adjustable diaphragm visor 24 (a,b). The visor position 24a (FIGS. 9 and 10A) is for a period of use during high luminosity environmental conditions. The visor position 24b of FIG. 10B is used during periods of low or very dim luminosity conditions. The swing angle λ (FIG. 9) denotes all the adjustment positions necessary to prevent regular magnified fields overlap during all environmental lighting conditions between 24a and 24b.

Figure 11:
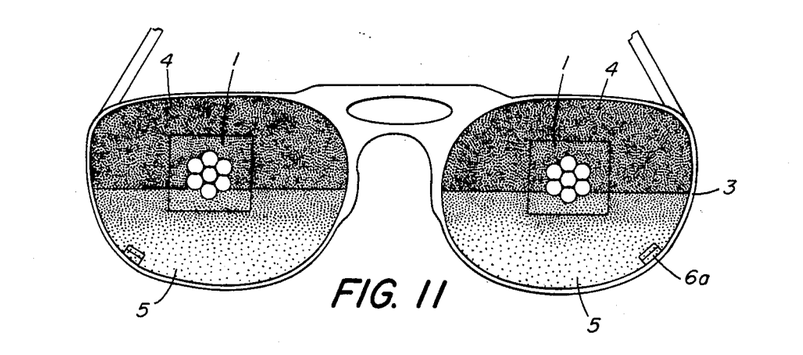
FIG. 11 is a perspective view of still another embodiment of the invention with a hexagonal cluster of telemicroscopes mounted in each spectacle lens.

A larger cluster of these scopes, FIG. 11, properly aligned in the carrier and partially or totally rimming the perimeter of the pupil, may be used to aid retinal impaired patients in restoring lost visual field.

Figure 12:
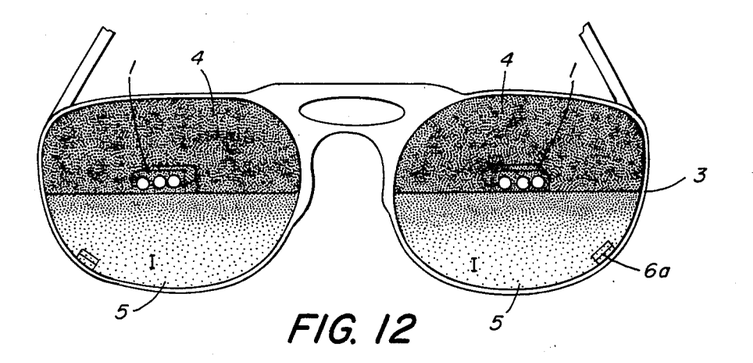
FIG. 12 is a perspective view of an embodiment of the invention in which a cluster of three telemicroscopes is formed in a boxlike structure.
Figure 13:
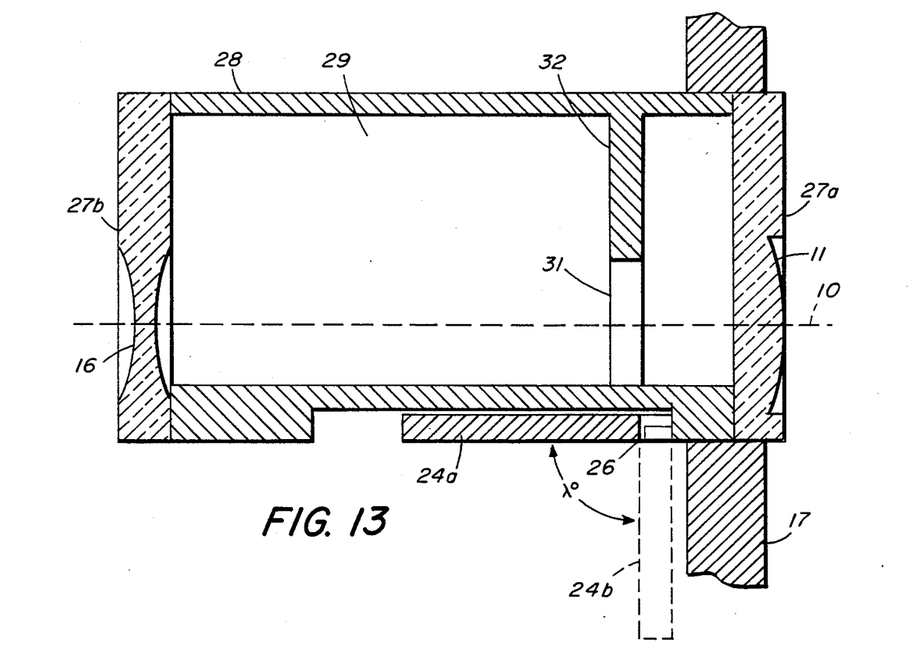
FIG. 13 is an enlarged sectional elevational view of one of the telemicroscopes of FIG. 12.
Figure 14:
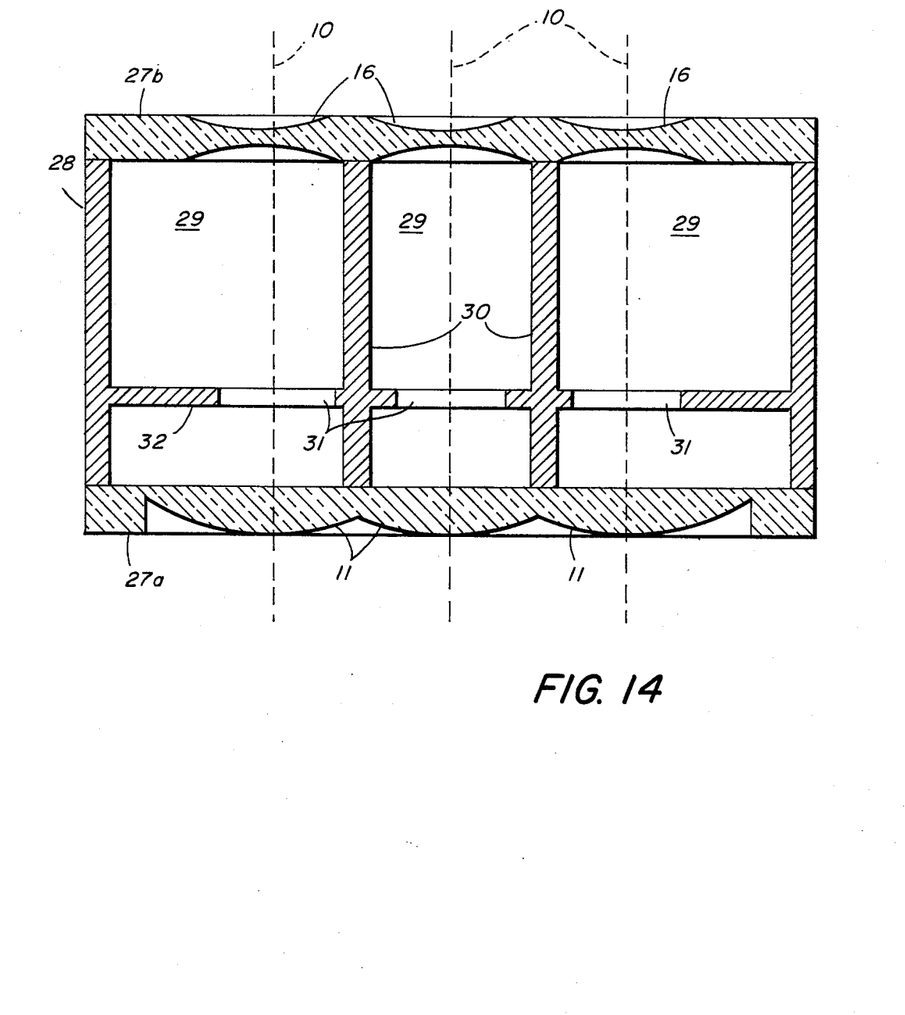
FIG. 14 is a plan sectional view of a cluster of telemicroscopes of FIG. 12.

An alternative design for the tri-scope panarama configuration with bilevel capability, shown in FIGS. 12-14, could prove more advantageous with regard to scope alignments and magnified picture-blending parameters. FIG. 12 illustrates the perspective view of this alternative design. FIGS. 13 and 14 display sectional side and top views respectively. Here the negative lens elements 16 and the positive lens elements 11 are not enclosed in basic tubular structures. Instead, all positive as well as negative lens elements are molded or mounted into thin plastic plates 27a and 27b respectively. The positive and negative element molded plastic plates are positioned so as to properly align the lens elements 16 and 11 on center line 10. These plates are then cemented in place to form the opposite ends of a retangular shaped box-like (geometric prism) structure 28, FIGS. 13 and 14. This box-like structure is sectioned into as many chambers, 29, as there are pairs of matching positive and negative lens elements. This rectangular box-like prism 28 is coated inside and outside with a non-reflective light absorbent substance to eliminate internal and external glare. The chamber walls 30 serve as baffles between lens pairs to prevent internal difusion of light between the three scope units shown in FIG. 14.

In order to maintain an adequate depth of magnified field with this design of the tri-scope panaroma configuration, it is necessary to insert an internal diaphragm 31 between each pair of postive and negative lens elements. The diaphragm openings are located within a plastic plate 32 affixed to the inside structure wall. The location of the diaphragms 31 (no more than two millimeters behind the center of the positive element) and its diameter are again dictated by the previously described formula $L_N/ID_N = 10/3.0$.

In a similar manner a cluster arrangement as previously described in FIG. 11 can also be constructed in a cylindrical shaped structure, again equipped with properly oriented chambers. Here the front and back disk-shaped plates of the cylinder contain either ground or molded-in positive and negative lens elements in a manner previously described. The internal diaphragms are also present and aligned between positive and negative pairs of lenses according to the proportion $L_N/ID_N = 10/3.0$. Because of the cylindrical shape of this cluster structure, the external diameter may be threaded so as to allow a screw in attachment to the carrier.

As can be seen in FIG. 13, the basic external diaphragm visor 24a-24b assemblage as previously described with respect to FIGS. 9 and 10 is employed in the present design also. Its function and operation have not changed for this design.

As was mentioned in the general description, the dimensions of this optical system as well as the dioptric powers of the lens elements may vary widely depending on the needs and preferences of the patient. Hence, only the specifications of two typically representative scopes are defined in the following tables. Table 1 is a representative telescopic system which is also convertable to a microscopic system, while Table 2 is a system basically intended to be used as a microscope also with telescopic conversion capabilities. They are both within the recommended range of 4.75 to ten millimeter outer diameters.

TABLE 1

A Representative Telescope Specifications 4X Unit

| Tubes | No. | Internal Diam. (mm) | External Diam. (mm) | Length (mm) |
|---|---|---|---|---|
| Plastic | 12 | 4.76 | 6.35 | 12 |
| Long Nylon | 14 | 2.77 | 4.76 | 8 |
| Nylon Cap | 15 | 2.77–4.76 | 5.3 | 2.5 |
| Nylon Disk | 13 | 2.77 | 6.35 | 1 |

| Lenses | Type | Material | Index | Diam. (mm) | Diopters |
|---|---|---|---|---|---|
| Positive | Plano Convex | Plastic | 1.49 | 6.35 | +62.5 |
| Negative | Biconcave | Flint Glass | 1.74–1.86 | 3.175 | −250 |

TABLE 2

A Representative Microscope Specifications Variable 4X to 6X Unit

| Tubes | No. | Internal Diam. (mm) | External Diam. (mm) | Length (mm) |
|---|---|---|---|---|
| Plastic | 12 | 6.35 | 7.93 | 12 |
| Long Nylon | 14 | 4.25 | 6.35 | 8 |
| Nylon Cap | 15 | 4.25–6.35 | 6.9 | 2.5 |
| Nylon Disk | 13 | 4.25 | 7.93 | 1 |

| Lenses | Type | Material | R.I. | Diam (mm) | Diopters |
|---|---|---|---|---|---|
| Positive | Plano Convex | Plastic | 1.49 | 7.93 | +62.5 |
| Negative | Biconcave | Flint Glass | 1.74–1.86 | 4 | −250 |

Figure 15:
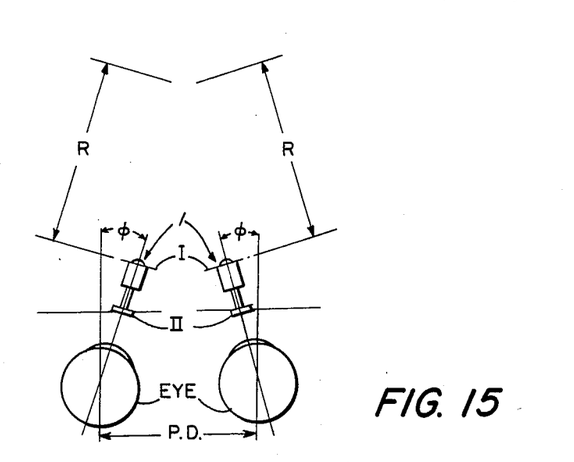
FIG. 15 is a schematic view of two telemicroscopes positioned with respect to a patient's eyes to illustrate the focal angle of the telemicroscopes.

FIG. 15 is an illustration used to indicate the alignment configuration which must be considered when fitting this optical system for binocular viewing. For telescopic viewing focus is at a principle distance of 100 to 150 meters, and the focal angle $\phi$ is relatively small (approximately 20 seconds of arc). At this focal setting of 100 meters with properly controlled shading, a single clear picture produced through the scopes, coordinating both eyes, is easily attained over a range of approximately 3 meters to the horizon. There is no adverse effect on the patient's own eye system. The small diameter scope affords this great depth of field while the controlled shading affords a magnified field large enough to maintain single vision through the two scopes at relatively close distances. For a bifocal binocular microscopic alignment for reading at 45 cm (approximately 18 in.), angle $\phi$ would be on the order of 3.5°. Depending on patient needs and preferences, of course, the $\phi$ angle alignment would become larger for a closer focusing on the observed material for a scope range of 3× to 5×. Thus the $\phi$ angles could conceivably vary greatly with patient need.

It should be noted at this time that when observing the telescopic binocular bilevel visual effect, the viewer would normally be concentrating on that portion of the regular field of view below or above the scope depending on the scope mount position above or below the central line of sight FIGS. 3A–B). But with a 4× scope, for example, the magnified object appears to be one-quarter of its actual distance from the observer. Hence the $\phi$ angle, if one were to concentrate on viewing through the scope, is greater than the $\phi$ angle when observing the regular unmagnified field of view of the same distant object. In order to see the bilevel effect, which is the magnified and regular field perceived simultaneously, the scope $\phi$ angle should match the $\phi$ angle of the eyes in the regular field observation. In this way, while the patient is focusing principle attention on a distant object in his regular field above or below the scope, he is also observing a single, eye-coordinated, magnified picture through the two scopes.

With the low angle $\phi$ of about 1°, on a bright day, the patient might experience some double vision if he concentrates on the magnified images, but that double vision is minimized by the large magnified field of view obtained through shading and a small diaphragm. And no double vision exists when the patient concentrates on the regular field of view.

FIG. 16 is an illustration of the bilevel visual effect seen when looking through a monocular or binocular optical system 18 mounted in a carrier(s) as previously described and within the patient's regular field of view 21. Here the line of sight is along a highway 19 extending into a mountainous area along the horizon. The principle object being observed is a vehicle 20 at a distance on the highway. The main tint division line 3 separates the two shading pattern areas 4 and 5. The shading pattern as seen affords a coordination of the diameters of the magnified scope field 18 with the physical diameter of the scope 1 within the regular field of view 21. Without such coordination a ring with no image would surround the magnified image.

The degree of tint or level of darkness as viewed through areas 4 and 5 of FIG. 16 must be determined by the patient's visual dictates.

While the invention has been shown and described with reference to preferred embodiments thereof, it will be understood by those skilled in the art that various changes in form and details may be made therein without departing from the spirit and scope of the invention as defined by the appended claims.

I claim:

1. Spectacles comprising a carrier frame to be supported on a wearer for positioning spectacle lenses in front of the eyes of the wearer and a multiple lens optical instrument mounted to at least one of the lenses, characterized in that:

the optical instrument extends from a front lens of the instrument at about the spectacle lens toward the wearer's eye, is less than about 16 mm in overall length, and has an internal diaphragm with an aperture of about 4 mm.

2. Spectacles as claimed in claim 1 characterized in that the ratio $L_N/ID_N$ of the length $L_N$ of the optical instrument, from the diaphragm of the instrument to a negative lens of the instrument near the eye, to the inner diameter $ID_N$ of the instrument at the diaphragm is about 3.

3. Spectacles as claimed in claim 2 wherein the ratio $L_N/ID_N$ is greater than 3.

4. Spectacles as claimed in claim 1 characterized in that the optical length of the optical instrument is adjustable for focal adjustment.

5. Spectacles as claimed in claim 1 wherein the perceived periphery of the magnified image viewed through the optical instrument closely matches the perceived outer periphery of the optical instrument.

6. Spectacles as claimed in claim 1 wherein the optical instrument is of a smaller outer diameter and is mounted to be held close to the wearer's eye at about but offset relative to the central viewing axis of the eye such that the person is able to view and perceive a magnified image and a nonmagnified image simultaneously.

7. Spectacles as claimed in claim 1 wherein the spectacle lens to which the optical instrument is mounted incorporates shading.

8. Spectacles as claimed in claim 7 characterized by a cluster of telemicroscopes mounted to the spectacle lens for panaromic viewing with the views through the individual telemicroscopes blended together.

9. Spectacles comprising a carrier frame to be supported on a wearer for positioning spectacle lenses in front of the eyes of the wearer and a multiple lens optical instrument mounted to at least one of the lenses, characterized in that:
the optical instrument has only two lenses mounted in a barrel which is less than about 16 mm in overall length and extends from a front lens of the instrument at about the spectacle lens toward the wearer's eye, and the optical length of the optical instrument is adjustable for focal adjustment.

10. Telemicroscopic spectacles comprising a carrier frame to be supported on the nose of a wearer for positioning spectacle lenses in front of the eyes of the wearer and a telemicroscope mounted to at least one of the lenses, characterized in that:
the telemicroscope has an internal diaphragm of about 4 mm and is mounted to a spectacle lens incorporating shading.

11. Telemicroscopic spectacles as claimed in claim 10 characterized in that the telemicroscope extends from a front lens of the telemicroscope at about the spectacle lens toward the wearer's eye and has a small internal diaphragm for providing a large depth of field ranging at least from several meters to infinity.

12. Telemicroscopic spectacles as claimed in claim 10 wherein the spectacles lens shading is darkest at about the telemicroscope and lighter towards the periphery of the spectacle lens.

13. Telemicroscopic spectacles as claimed in claim 10 wherein the perceived periphery of the magnified image viewed through the telemicroscope closely matches the perceived outer periphery of the telemicroscope.

14. Telemicroscopic spectacles as claimed in claim 10 wherein the telemicroscope is of a small outer diameter and is mounted to be held close to the wearer's eye at about but offset relative to the central viewing axis of the eye such that the person is able to view and perceive a magnified image and a non-magnified image simultaneously.

15. Telemicroscopic spectacles as claimed in claim 14 wherein the shading is darkest over about half of the lens and surrounds the telemicroscope.

16. Telemicroscopic apparatus comprising a telemicroscope mounted to a carrier for positioning of the telemicroscope in front of a person's eye, characterized in that:
the telemicroscope is of a small outer diameter with an optic axis within 5 millimeters of an outer edge thereof and is mounted to be held close to the person's eye with the outer edge at about but offset relative to the central viewing axis of the eye with the optic axis of the telemicroscope within 5 millimeters of the central viewing axis of the eye such that the person is able to view and perceive a nonmagnified image of an object near the center of vision and a clear magnified image of the same object simultaneously without confusion with the edge and center axis of the magnified image close to the center of the nonmagnified image.

17. Telemicroscopic apparatus as claimed in claim 16 wherein the perceived periphery of the magnified image viewed through the telemicroscope closely matches the perceived outer periphery of the telemicroscope.

18. Telemicroscopic apparatus as claimed in claim 17 further comprising means to enlarge the perceived outer periphery of the telemicroscope.

19. Telemicroscopic apparatus as claimed in claim 18 wherein the means to increase the perceived outer periphery is a diaphragm movable toward the eye along the telemicroscope.

20. Telemicroscopic apparatus as claimed in claim 18 wherein the means to increase the perceived outer periphery is an asymmetric diaphragm which is rotatable about the telemicroscope.

21. Telemicroscopic apparatus as claimed in claim 16 characterized by a cluster of telemicroscopes mounted for panaromic viewing with the views through the individual telemicroscopes blended together.

22. Telemicroscopic spectacles as claimed in claim 16 characterized by a cluster of telemicroscopes mounted to a shaded spectacle lens for panaromic viewing with the views through the individual telemicroscopes blended together.

23. Telemicroscopic apparatus as claimed in claim 16 characterized in that the optical length of the telemicroscope is adjustable for focal adjustment.

24. Telemicroscopic apparatus as claimed in claim 23 wherein positive and negative lenses of the telemicroscope are jointed through adjustable threaded conjunctions.

25. Telemicroscopic apparatus as claimed in claim 16 wherein the telemicroscope is mounted for adjustment of the angle of the telemicroscope relative to the carrier.

26. Telemicroscopic apparatus as claimed in claim 16 wherein the telemicroscope is less than about 16 millimeters in overall length and less than about 10 millimeters in outer diameter.

27. Telemicroscopic apparature as claimed in claim 26 wherein the telemicroscope has a small internal diaphragm of about 4 millimeters.

28. Telemicroscopic spectacles comprising a carrier frame to be supported on a wearer for positioning spectacle lenses in front of the eyes of the wearer and a telemicroscope mounted to at least one of the lenses, characterized in that:
the telemicroscope extends from a front lens of the telemicroscope at about the spectacle lens toward the wearer's eye, is less than about 16 millimeters in overall length, is less than about 10 millimeters in outer diameter, and has an internal diaphragm with an aperture of about 4 millimeters;
positive and negative lenses of the telemicroscope are joined through adjustable threaded connections to enable adjustment of the optical length of the telemicroscope;
means are provided to enlarge the perceived outer periphery of the telemicroscope to enable that periphery to be matched to the perceived periphery of the magnified image viewed through the telemicroscope;

the spectacle lens to which the telemicroscope is mounted incorporates shading; and the telemicroscope is mounted to be held at about eyelash length from the wearer's eye at about but offset relative to the central viewing axis of the eye such that the person is about to view and perceive a magnified image and a nonmagnified image simultaneously.

29. Telemicroscopic apparatus comprising a telemicroscope mounted to a carrier for positioning of the telemicroscope in front of a person's eye, characterized in that:

the telemicroscope is of a small outer diameter and is mounted to be held close to the person's eye at about but offset relative to the central viewing axis of the eye with the optic axis of the telemicroscope close to the central viewing axis of the eye such that the person is able to view and perceive a nonmagnified image of an object near the center of vision and a clear magnified image of the same object simultaneously without confusion with the edge and center axis of the magnified image close to the center of the nonmagnified image, wherein the perceived periphery of the magnified image viewed through the telemicroscope closely matches the perceived outer periphery of the telemicroscope and the telemicroscopic apparatus further comprises means to enlarge the perceived outer periphery of the telemicroscope.

30. Telemicroscopic apparatus as claimed in claim 29 wherein the means to increase the perceived outer periphery is a diaphragm movable toward the eye along the telemicroscope.

31. Telemicroscopic apparatus as claimed in claim 29 wherein the means to increase the perceived outer periphery is an asymmetric diaphragm which is rotatable about the telemicroscope.

32. Telemicroscopic apparatus comprising a telemicroscope mounted to a carrier for positioning of the telemicroscope in front of a person's eye, the apparatus comprising:

a cluster of telemicroscopes mounted to a shaded spectacle lens for panoromic viewing with the views through the individual telemicroscopes blended together, each telemicroscope being of a small outer diameter and mounted to be held close to the person's eye at about but offset relative to the central viewing axis of the eye with the optic axis of the telemicroscope close to the central viewing axis of the eye such that the person is able to view and perceive a nonmagnified image of an object near the center of vision and a clear magnified image of the same object simultaneously without confusion with the edge and center axis of the magnified image close to the center of the nonmagnified image.

33. Telemicroscopic apparatus comprising a telemicroscope mounted to a carrier for positioning of the telemicroscope in front of a person's eye, wherein:

the telemicroscope is of a small outer diameter and has an internal diaphragm with an aperture of about 4 millimeters and is mounted to be held close to the person's eye at about but offset relative to the central viewing axis of the eye with the optic axis of the telemicroscope close to the central viewing axis of the eye such that the person is able to view and perceive a nonmagnified image of an object near the center of vision and a clear magnified image of the same object simultaneously without confusion with the edge and center axis of the magnified image close to the center of the nonmagnified image.

* * * * *